United States Patent [19]
Kawaguchi

[11] 4,212,367
[45] Jul. 15, 1980

[54] MANUAL LEVER FOR A VEHICLE

[75] Inventor: Hiroshi Kawaguchi, Mishima, Japan

[73] Assignee: Toyota Jidosha Kogyo Kabushiki Kaisha, Aichi, Japan

[21] Appl. No.: 886,112

[22] Filed: Mar. 13, 1978

[30] Foreign Application Priority Data

Apr. 13, 1977 [JP] Japan ................................. 52-42353

[51] Int. Cl.² .............................................. B60T 7/10
[52] U.S. Cl. ..................................... 180/271; 74/491; 180/77 R
[58] Field of Search ................... 180/82 G, 77 R, 271; 74/491, 523

[56] References Cited

U.S. PATENT DOCUMENTS

| 778,185 | 2/1904 | Graham | 74/491 |
|---|---|---|---|
| 1,722,565 | 7/1929 | Dunn | 180/90 |
| 4,075,907 | 2/1978 | Petrzelka | 74/523 |

*Primary Examiner*—John P. Silverstrim
*Attorney, Agent, or Firm*—Stevens, Davis, Miller & Mosher

[57] ABSTRACT

A manual lever mounted beside a driver's seat in a vehicle and pivoted forward and backward by the hand of the driver seated in the driver's seat, wherein the plane of pivotal movement of the lever is inclined toward the driver's seat and/or is deflected from the longitudinal direction of the vehicle so that the lever approaches the seat when it is pivoted backward.

4 Claims, 6 Drawing Figures

MANUAL LEVER FOR A VEHICLE

BACKGROUND OF THE INVENTION

The present invention relates to a manual lever mounted beside a driver's seat in a vehicle and pivoted forward and backward by the hand of the driver who is seated in the driver's seat.

In some automobiles the parking brake lever is mounted in a space left between the driver's seat and the front passenger seat, and usually in this case in a console box mounted between the driver's seat and the front passenger seat.

Conventionally such a central lever is mounted so as to pivot in a plane which is vertical and extends along the longitudinal axis of the vehicle, as illustrated in FIG. 1, which shows a parking brake lever formed as a central lever mounted in a console box as viewed from the back of the lever and of the driver's seat. In this case the line which connects the pivot point of the lever and the pivot point of the driver's arm, which essentially is his shoulder, makes a relatively large angle such as $\alpha$ relative to the plane of pivotal movement of the lever. This angle of divergence is not desirable for the best operation of the lever from an ergonomic standpoint.

Furthermore, in the conventional structure of a central lever having a plane of pivotal movement which is vertical and extends along the longitudinal axis of the vehicle, the line of the force exerted by the driver for operating the lever is oblique to the direction of movement of the point at which the force is exerted by a relatively large angle such as $\beta$ when viewed from above, as shown in FIG. 2. This angle of deviation is also not desirable for the best operation of the lever from an ergonomic standpoint.

SUMMARY OF THE INVENTION

It is therefore the object of the present invention to obviate the aforementioned drawbacks of the conventional central lever and to provide an improved manual lever mounted beside a driver's seat in a vehicle and pivoted forward and backward by the hand of the driver seated in the seat in the most ergonomically desirable manner.

In accordance with the present invention, the above-mentioned object is accomplished by providing a manual lever of the aforementioned kind wherein the plane of pivotal movement of said lever is inclined from the vertical toward said seat and/or is oblique to the longitudinal axis of said vehicle so that said lever approaches said seat when said lever is pivoted backward.

BRIEF DESCRIPTION OF THE DRAWING

The present invention will become more fully understood from the detailed description given hereinbelow and the accompanying drawings which are given by way of illustration only and thus are not limitative of the presnt invention.

In the accompanying drawings.

DESCRIPTION OF THE PREFERRED EMBODIMENT

Figure 1:
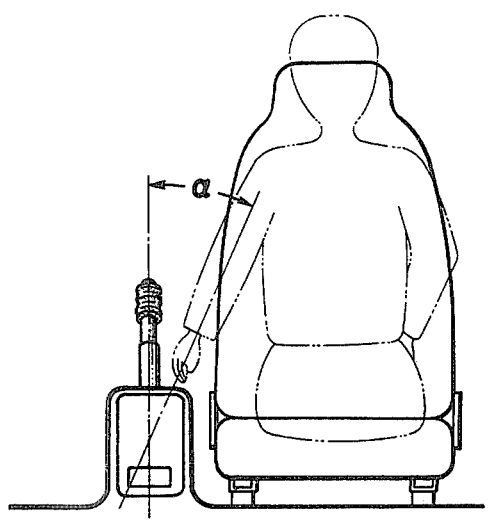
FIG. 1 is a rear view of a driver's seat in a vehicle and of a conventional manual lever mounted beside the driver's seat.
Figure 3:
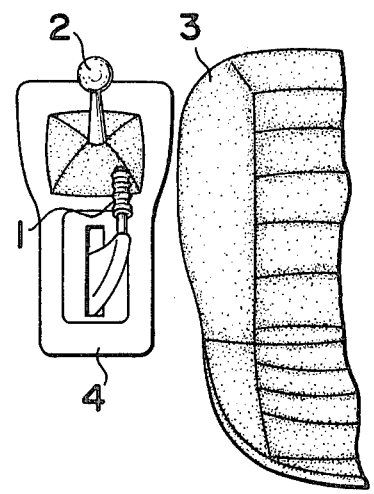
FIG. 3 is a plan view of a driver's seat in a vehicle and of an embodiment of a manual lever mounted beside the driver's seat in accordance with the present invention.
Figure 4:
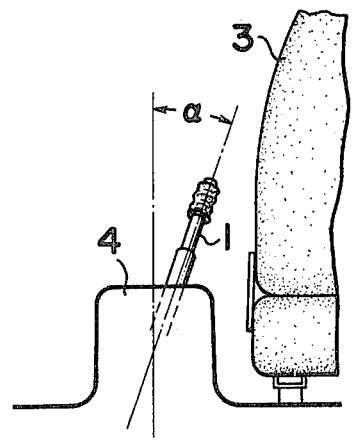
FIG. 4 is a rear view of the driver's seat and the manual lever shown in FIG. 3.

Referring to FIGS. 3 and 4 showing the first embodiment of the present invention, the manual lever designated by reference numeral 1 is a parking brake lever which incorporates the concept of the present invention and is mounted together with a shift control lever 2 beside a driver's seat 3 in a vehicle. In this embodiment the parking brake lever 1 and the shift lever 2 are mounted in a console box 4 provided beside the driver's seat 3. As understood from comparison of FIGS. 3 and 4, the latter being the rear view of the parking brake lever 1, the driver's seat 3 and the console box 4 shown in FIG. 3, the plane of pivotal movement of the lever 1 is inclined from the vertical toward the seat 3 by an angle $\alpha$ which corresponds to the angle $\alpha$ shown in FIG. 1, so that this plane, while parallel to the longitudinal axis of the vehicle, contains the position of the actuating shoulder of the driver.

Figure 2:
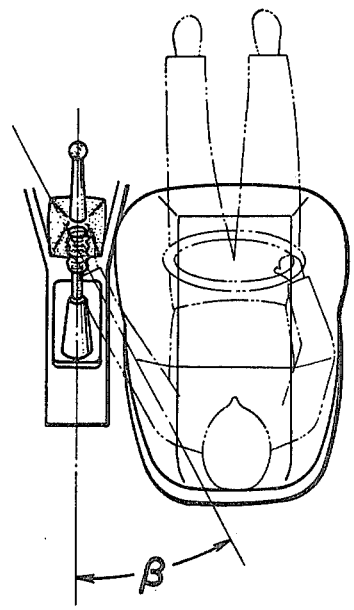
FIG. 2 is a plan view of the driver's seat and the conventional manual lever shown in FIG. 1.
Figure 5:
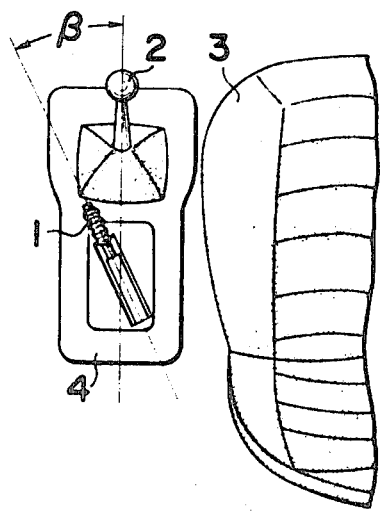
FIG. 5 is a view similar to FIG. 3 showing another embodiment of the present invention.

FIG. 5 is a plan view which is similar to FIG. 3 and shows another embodiment of the present invention. In FIG. 5 the portions corresponding to those shown in FIG. 3 are designated by the same reference numerals. In this embodiment the parking brake lever 1 is arranged to have a plane of pivotal movement which is oblique to the longitudinal axis of the vehicle by an angle $\beta$ so that the lever 1 approaches the seat 3 when pivoted backward. The angle $\beta$ in FIG. 5 corresponds to the angle $\beta$ in FIG. 2. Thus this plane is vertical, but oblique to the longitudinal axis of the vehicle, and contains the position of the actuating shoulder of the driver.

Figure 6:
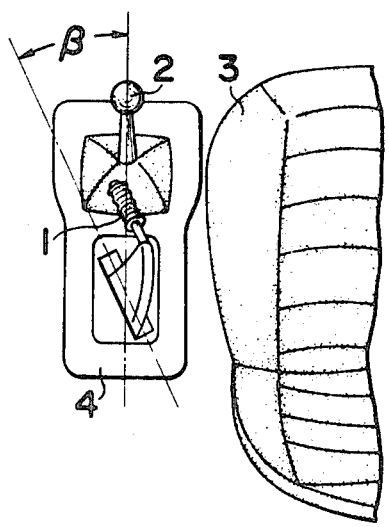
FIG. 6 is a view similar to FIGS. 3 and 5 showing still another embodiment of the present invention.

FIG. 6 shows still another embodiment of the present invention in a plan view similar to FIGS. 3 and 5. In FIG. 6 the portions corresponding to those shown in FIGS. 3 and 5 are also designated by the same reference numerals. In this embodiment the parking brake lever 1 is arranged to have a plane of pivotal movement which is inclined from the vertical toward the seat 3 by an angle which is not shown in the figure but corresponds to the angle $\alpha$ shown in FIG. 1 and is also oblique to the longitudinal axis of the vehicle by an angle $\beta$ corresponding to the angle $\beta$ shown in FIG. 2 so that the lever 1 approaches the seat 3 when pivoted backward. Again this plane contains the position of the actuating shoulder of the driver. Therefore this embodiment is the combination of the embodiments shown in FIGS. 3 and 5 in technical concept.

Although the invention has been shown and described with respect to some preferred embodiments thereof incorporated into a parking brake lever, it should be understood by those skilled in the art that various changes and omissions of the form and detail thereof and other embodiments incorporated in other kinds of manual levers, such as, for instance, selector levers in automatic transmissions, may be made without departing from the scope of the invention. Furthermore, reference to the position of the actuating shoulder of the driver should be understood to refer to the approximate average position of the shoulder of the average driver as determined by ergonomic studies. Still furthermore, it should be understood that any inclination of the lever in either of the suggested directions, while it may not be sufficient to be ideal, is an improvement, and comes within the scope of the present invention.

I claim:

1. A manual lever mounted along one side of a driver's seat in a vehicle, so as to be pivoted in a plane of pivotal movement by the hand of a driver seated in said seat, wherein the plane of pivotal movement of said lever is oblique to the longitudinal axis of said vehicle so that said lever approaches said seat when said lever is pivoted backward.

2. The lever of claim 1, wherein the plane of pivotal movement of said lever is vertical and contains an approximate position of the shoulder of the actuating arm of an average driver seated in said driver's seat.

3. A manual lever mounted along one side of a driver's seat in a vehicle so as to be pivoted in a plane of pivotal movement by the hand of a driver seated in said seat, wherein the plane of pivotal movement of said lever is inclined from the vertical toward said seat and is also oblique to the longitudinal axis of said vehicle so that said lever approaches said seat when said lever is pivoted backward.

4. The lever of claim 3, wherein the plane of pivotal movement contains an approximate position of the shoulder of the actuating arm of an average driver seated in said driver's seat.

* * * * *